(12) United States Patent
Loewen et al.

(10) Patent No.: US 9,833,648 B2
(45) Date of Patent: Dec. 5, 2017

(54) METHODS AND SYSTEMS FOR SUPPRESSING PYROPHORIC METAL FIRES

(71) Applicant: GE-Hitachi Nuclear Energy Americas LLC, Wilmington, NC (US)

(72) Inventors: Eric Paul Loewen, Wilmington, NC (US); Brett Jameson Dooies, Wilmington, NC (US); Seth Ryan Paul Strege, Wilmington, NC (US); Nicholas Francis O'Neill, Wilmington, NC (US); Dana Christine Miranda, Wilmington, NC (US); Haley Michelle Cowen, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 319 days.

(21) Appl. No.: 14/579,512

(22) Filed: Dec. 22, 2014

(65) Prior Publication Data

US 2016/0175627 A1    Jun. 23, 2016

(51) Int. Cl.
| | |
|---|---|
| *A62C 3/06* | (2006.01) |
| *A62C 35/10* | (2006.01) |
| *G21C 9/04* | (2006.01) |
| *A62D 1/00* | (2006.01) |
| *G21C 1/03* | (2006.01) |
| *G21C 9/00* | (2006.01) |
| *G21C 17/025* | (2006.01) |

(52) U.S. Cl.
CPC ............ *A62C 3/06* (2013.01); *A62D 1/0007* (2013.01); *G21C 9/04* (2013.01); *G21C 1/03* (2013.01); *G21C 9/002* (2013.01); *G21C 17/0255* (2013.01); *Y02E 30/40* (2013.01)

(58) Field of Classification Search
CPC .. A62C 3/06; A62C 35/10; G21C 1/03; G21C 9/002; G21C 9/04; G21C 17/0255; A62D 1/0007
USPC ............ 169/26, 46, 47, 49, 54, 56; 376/250, 376/277, 279
See application file for complete search history.

(56) References Cited

U.S. PATENT DOCUMENTS

| | | | |
|---|---|---|---|
| 3,714,986 A | 2/1973 | Broadley | |
| 3,871,459 A * | 3/1975 | Falgayrettes | ............ A62C 3/06 |
| | | | 169/49 |
| 3,900,366 A | 8/1975 | Sakaguchi | |

(Continued)

FOREIGN PATENT DOCUMENTS

EP          1300178 A1      4/2003

OTHER PUBLICATIONS

PCT Invitation to Pay Additional Fees issued in connection with corresponding PCT Application No. PCT/US2015/065706 dated Apr. 6, 2016.

*Primary Examiner* — Darren W Gorman
(74) *Attorney, Agent, or Firm* — Harness, Dickey & Pierce (57) ABSTRACT

A method for suppressing a pyrophoric metal fire may include arranging a suppression system above a containment structure. The suppression system includes a first extinguishing agent. The containment structure is configured to contain and isolate a pyrophoric metal from ambient air. The suppression system is configured to activate upon a leak and ignition of the pyrophoric metal so as to release the first extinguishing agent to suppress the pyrophoric metal fire.

19 Claims, 8 Drawing Sheets

(56) References Cited

U.S. PATENT DOCUMENTS

| | | | | |
|---|---|---|---|---|
| 4,091,875 A | * | 5/1978 | Colome | F27D 5/00 |
| | | | | 169/49 |
| 4,356,869 A | * | 11/1982 | Buttrey | A62C 3/06 |
| | | | | 169/49 |
| 4,860,832 A | * | 8/1989 | Levillain | A62C 3/06 |
| | | | | 137/449 |
| 2013/0180739 A1 | | 7/2013 | Richardson et al. | |
| 2013/0181158 A1 | | 7/2013 | Guo et al. | |
| 2013/0264509 A1 | | 10/2013 | Shalev et al. | |
| 2013/0333902 A1 | | 12/2013 | Richardson et al. | |
| 2015/0367153 A1 | * | 12/2015 | Slesinski | A62C 3/06 |
| | | | | 169/54 |

\* cited by examiner

METHODS AND SYSTEMS FOR SUPPRESSING PYROPHORIC METAL FIRES

BACKGROUND

Field

The present disclosure relates to methods and associated systems for the suppression of metallic fires.

Description of Related Art

A liquid metal-cooled nuclear reactor, also referred to as a liquid metal fast reactor (LMFR), is a fast neutron nuclear reactor where the primary coolant is a liquid metal. Various types of liquid metals with relatively high heat capacities (which provide thermal inertia against overheating) may be used as the primary coolant. An example of a liquid metal-cooled nuclear reactor is a sodium-cooled fast reactor (SFR). In a sodium-cooled fast reactor (SFR), liquid sodium is used as the primary coolant instead of water. Water is difficult to use as a coolant for a fast reactor, because water acts as a neutron moderator that slows the fast neutrons into thermal neutrons. In contrast, sodium atoms are much heavier than both the oxygen and hydrogen atoms found in water. As a result, the neutrons lose less energy in collisions with sodium atoms. Sodium also need not be pressurized since its boiling point is much higher than the reactor's operating temperature. Furthermore, sodium does not corrode steel reactor parts.

A potential concern for a sodium-cooled fast reactor (SFR) is the leakage of sodium. Sodium is a pyrophoric metal and will ignite spontaneously when contacted with air and/or water. The exothermic reaction of sodium with air and water is shown below by the following equations.

$$2Na(l) + O_2(g) \rightarrow Na_2O_2(s)$$

$$4Na(l) + O_2(g) \rightarrow 2Na_2O(s)$$

$$2Na(l) + 2H_2O \rightarrow 2NaOH(aq) + H_2(g)$$

Notably, sodium hydroxide (NaOH) is caustic and hydrogen ($H_2$) is flammable. Additionally, sodium peroxide ($Na_2O_2$) and sodium oxide ($Na_2O$) will also form sodium hydroxide (NaOH) if contacted with water.

Conventionally, a metallic fire (e.g., sodium fire) in a nuclear reactor is extinguished by inerting the area where the pyrophoric metal (e.g., sodium) is leaking. The inerting may be achieved with a vacuum pump that is used to remove the air from the area of the leak while supplying an inert gas (e.g., nitrogen, argon) which does not react with the pyrophoric metal. By removing the reaction source (e.g., oxygen) from the area of the leak, the metallic fire may be extinguished. However, this inerting approach is dangerous to plant workers who may be in the area of the leak and, thus, accidentally exposed to the oxygen-deficient environment.

SUMMARY

A method for suppressing a pyrophoric metal fire may include arranging a suppression system above a containment structure. The suppression system includes a first extinguishing agent. The containment structure is configured to contain and isolate a pyrophoric metal from ambient air. The suppression system is configured to activate upon a leak and ignition of the pyrophoric metal so as to release the first extinguishing agent to suppress the pyrophoric metal fire.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

A method for suppressing a pyrophoric metal fire according to example embodiments may include arranging a suppression system above a containment structure. The suppression system includes a first extinguishing agent, and the containment structure is configured to contain and isolate a pyrophoric metal from ambient air. The suppression system is configured to activate upon a leak and ignition of the pyrophoric metal so as to release the first extinguishing agent to suppress the pyrophoric metal fire.

Figure 1:
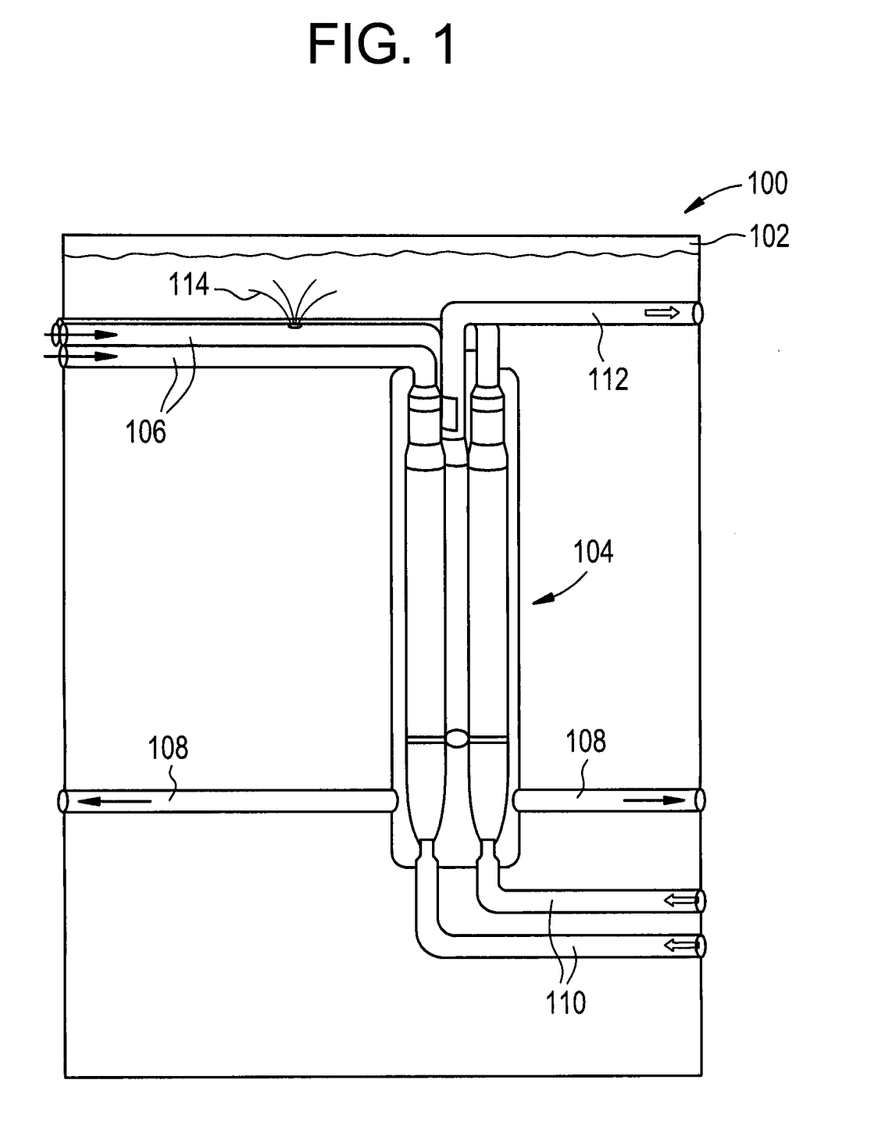
FIG. 1 is a view of a coating-type suppression system as implemented in a nuclear reactor according to an example embodiment of the present disclosure.

FIG. 1 is a view of a coating-type suppression system as implemented in a nuclear reactor according to an example embodiment of the present disclosure. Referring to FIG. 1, a coating-type suppression system 100 includes a fire extinguishing agent 102 (e.g., first extinguishing agent) and is disposed on a stable surface above a containment structure 104. The stable surface may be the ceiling of a chamber that houses the containment structure 104.

The containment structure 104 may be a steam generator of a liquid metal fast reactor and may include liquid metal inlet pipes 106, liquid metal outlet pipes 108, feedwater inlet pipes 110, and a steam outlet pipe 112, although example embodiments are not limited thereto. The containment structure 104 is configured to contain and isolate, inter alia, a pyrophoric metal from the ambient air. For instance, the pyrophoric metal may be an alkali metal. In a non-limiting embodiment, the alkali metal may be sodium.

As shown in FIG. 1, a leak 114 may occur in one or more of the liquid metal inlet pipes 106. However, it should be understood that the leak 114 may occur in other parts of the containment structure 104. Where the containment structure 104 contains a pyrophoric metal (e.g., sodium), a metallic fire may spontaneously occur when the pyrophoric metal leaks and comes into contact with oxygen and/or water (e.g., via the ambient air).

The coating-type suppression system 100 may be heat-activated and/or chemically-activated by the pyrophoric metal fire. For instance, the coating-type suppression system 100 may be configured such that a structural integrity thereof degrades in a presence of the pyrophoric metal fire in order to release the fire extinguishing agent 102. For smaller fires, the scope of the degradation may be limited to the vicinity of the coating-type suppression system 100 above the pyrophoric metal fire such that only a portion of the fire extinguishing agent 102 in that area is released and falls down onto the pyrophoric metal fire to suppress such combustion. On the other hand, for larger fires, a more extensive amount of the coating-type suppression system 100 may degrade and release the fire extinguishing agent 102 therein onto the combustion region(s). Thus, the coating-type suppression system 100 is relatively flexible in its ability to suppress or extinguish metallic fires of various sizes and at varying locations.

The structural integrity of the coating-type suppression system 100 may be configured to deteriorate when a surface of the coating-type suppression system 100 reaches an elevated temperature as a result of exposure to the pyrophoric metal fire. For instance, the structural integrity of the coating-type suppression system 100 may be configured to break down when the elevated temperature at the surface of the coating-type suppression system 100 reaches 75 degrees Celsius or more.

In addition to (or in lieu of) being heat-activated, the structural integrity of the coating-type suppression system 100 may be configured to deteriorate when exposed to one or more reaction byproducts of the pyrophoric metal fire. For instance, the structural integrity of the coating-type suppression system 100 may be configured to become embrittled when the one or more reaction byproducts includes hydrogen gas. In a non-limiting embodiment, the structural integrity of the coating-type suppression system 100 may be configured to break down when a concentration of the hydrogen gas reaches 50 pphm or more.

The coating-type suppression system 100 may be in the form of a continuous, conformal layer that is positioned (e.g., adhered to the ceiling) such that the fire extinguishing agent 102 will fall on the pyrophoric metal fire via gravity when released. For instance, the coating-type suppression system 100 may be configured as a polymer layer that includes the fire extinguishing agent 102, wherein the polymer layer is applied on a ceiling above the containment structure 104. The polymer layer may include the following structure wherein X is a chlorine, a carbonate, or another atom/molecule that will react with the pyrophoric metal (e.g., Na)

to form a thermodynamically stable product (e.g., NaCl, $Na_2CO_3$). However, it should be understood that other materials (that provide suitable heat-activation and/or chemical-activation properties) may also be used.

Figure 2:
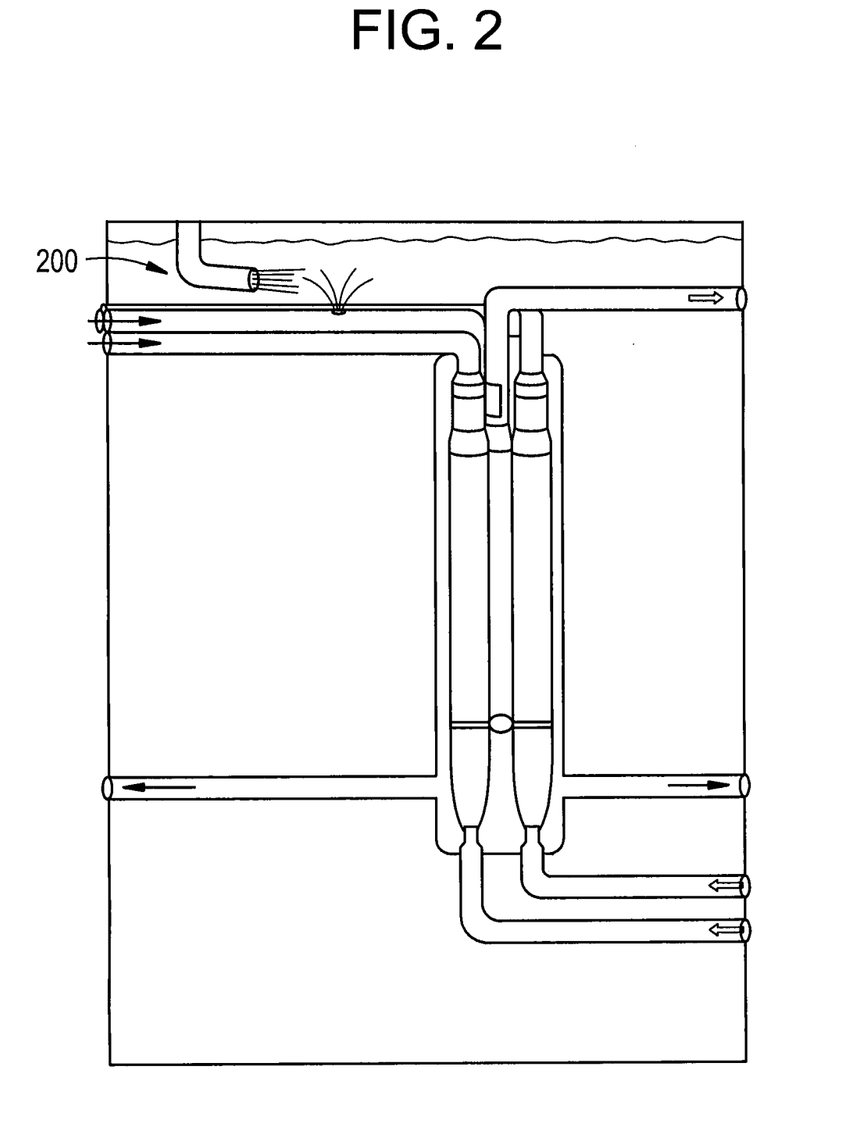
FIG. 2 is a view of a spray-type suppression system in conjunction with a coating-type suppression system as implemented in a nuclear reactor according to an example embodiment of the present disclosure.

FIG. 2 is a view of a spray-type suppression system in conjunction with a coating-type suppression system as implemented in a nuclear reactor according to an example embodiment of the present disclosure. Referring to FIG. 2, a spray-type suppression system 200 may be used alone or together with the coating-type suppression system 100 of FIG. 1 in order to suppress or extinguish any metallic fires that result from the leak 114 of a pyrophoric metal. The spray-type suppression system 200 may be actively controlled to allow a dispensing end thereof to spray a second extinguishing agent directly at the leak to suppress or extinguish the metallic fire. The second extinguishing agent may be the polymer material discussed in connection with FIG. 1, although example embodiments are not limited thereto. For instance, the second extinguishing agent may be Met-L-X. With regard to being configured for active control, the dispensing end of the spray-type suppression system 200 may be rotated and/or angled as needed. Additionally, one or more portions of the spray-type suppression system 200 may be extended and/or retracted as needed in order to reach a desired location. Although the spray-type suppression system 200 is shown in FIG. 2 as including a single spray structure that extends from the ceiling, it should be understood that example embodiments are not limited thereto. For instance, the spray-type suppression system 200 may include a plurality of spray structures. Additionally, one or more of the spray structures may be configured to extend from one or more of the ceiling, sidewalls, and/or floor. The spray-type suppression system 200 may be particularly useful for suppressing or extinguishing larger and/or continuing metallic fires.

Figure 3:
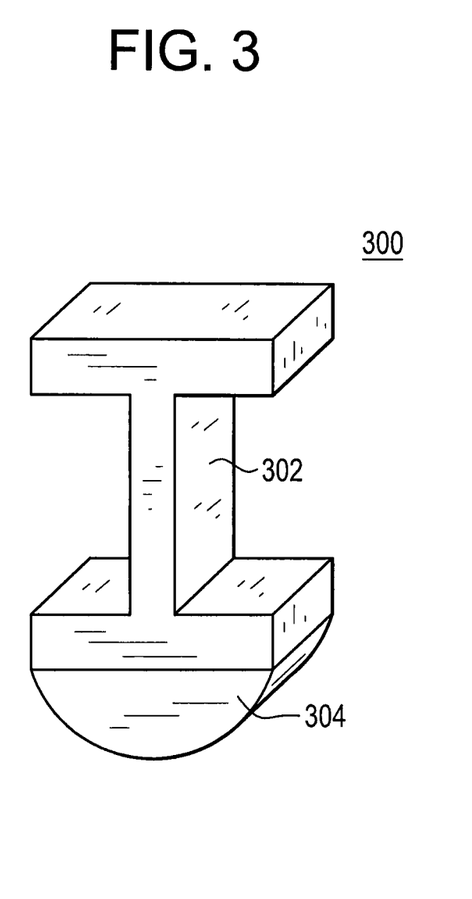
FIG. 3 is a view of an I-beam-type suppression system according to an example embodiment of the present disclosure.

FIG. 3 is a view of an I-beam-type suppression system according to an example embodiment of the present disclosure. Referring to FIG. 3, the I-beam-type suppression system 300 includes an I-beam structure 302 and a container secured to the bottom thereof. The container may be a metal casing (e.g., titanium sheet) that encloses a fire extinguishing agent therein. The metal casing may be formed to include defects and infused with hydrogen diffusion promoters (e.g., $CN^-$) in order to facilitate rapid deterioration of the container due to embrittlement via hydrogen diffusion. In an example embodiment, the metal casing may be configured as a partial-cylindrical container 304 and secured to a bottom of the I-beam structure 302. However, it should be understood that the metal casing may be configured into a variety of other suitable shapes. The fire extinguishing agent within the metal casing may be a salt-based powder (e.g., Met-L-X) or a graphite-based powder. Additionally, the fire extinguishing agent may include a weak acid (e.g., boric acid).

Figure 4:
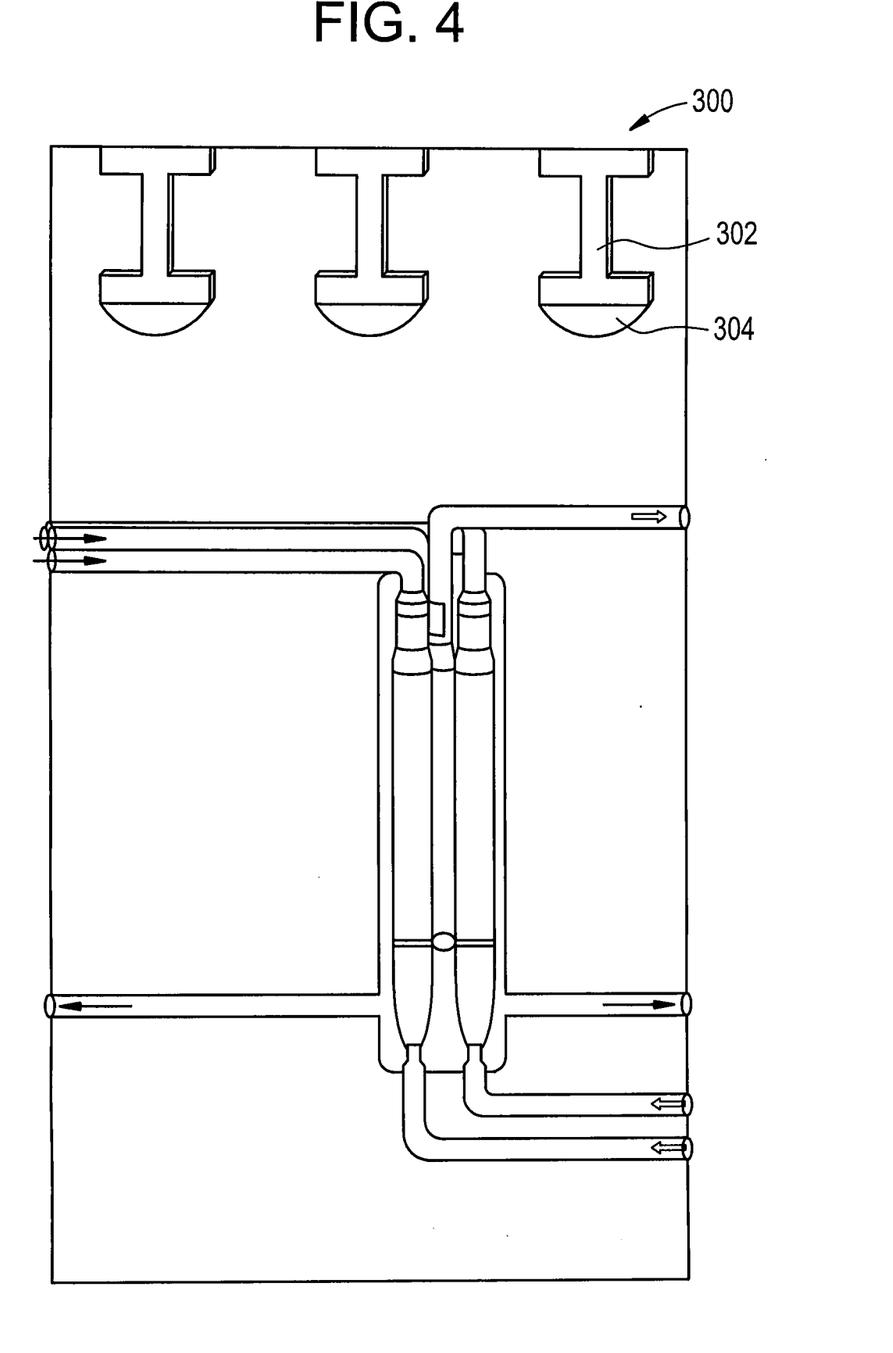
FIG. 4 is a view of an I-beam-type suppression system as implemented in a nuclear reactor according to an example embodiment of the present disclosure.

FIG. 4 is a view of an I-beam-type suppression system as implemented in a nuclear reactor according to an example embodiment of the present disclosure. Referring to FIG. 4, the I-beam-type suppression system 300 of FIG. 3 may be implemented in a liquid metal fast reactor. For instance, the I-beam structure 302 may be an existing structure that is already used to support the ceiling of the chamber housing the containment structure, wherein the partial-cylindrical container 304 is subsequently secured to the bottom of the I-beam structure 302 to form the I-beam-type suppression system 300. Alternatively, the combination of the I-beam structure 302 and the partial-cylindrical container 304 may already be first secured together to form the I-beam-type suppression system 300 and then brought into the chamber and mounted on the ceiling.

During operation of the liquid metal fast reactor, a pyrophoric metal within the containment structure may leak and cause a metallic fire. The I-beam-type suppression system 300 may be heat-activated and/or chemically-activated by the metallic fire. For example, as a result of the metallic fire, hydrogen gas may be produced so as to deteriorate the integrity of the partial-cylindrical container 304, thereby releasing the fire extinguishing agent therein.

Figure 5:
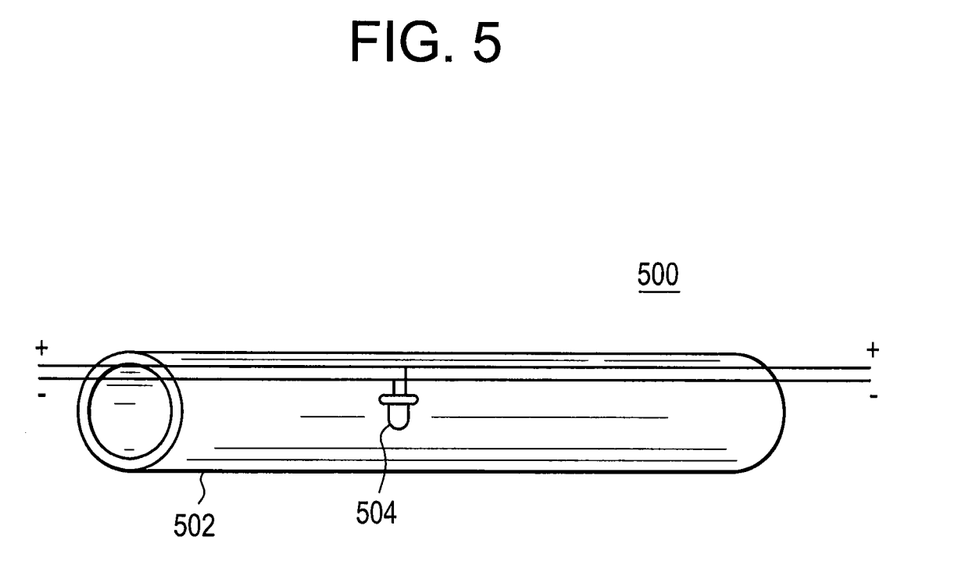
FIG. 5 is a view of a tube-type suppression system according to an example embodiment of the present disclosure.

FIG. 5 is a view of a tube-type suppression system according to an example embodiment of the present disclosure. Referring to FIG. 5, the tube-type suppression system 500 may include a metal casing that is configured as a tubular container 502. The metal casing may be formed to include defects and infused with hydrogen diffusion promoters (e.g., $CN^-$) in order to facilitate rapid deterioration of the container due to embrittlement via hydrogen diffusion. The tubular container 502 includes therein a fire extinguishing agent and a photodetector 504. The fire extinguishing agent may be a salt-based powder (e.g., Met-L-X) or a graphite-based powder. Additionally, the fire extinguishing agent may include a weak acid (e.g., boric acid). The photodetector 504 is configured to indicate whether there is degradation of the metal casing by detecting whether light is entering the metal casing.

Figure 6:
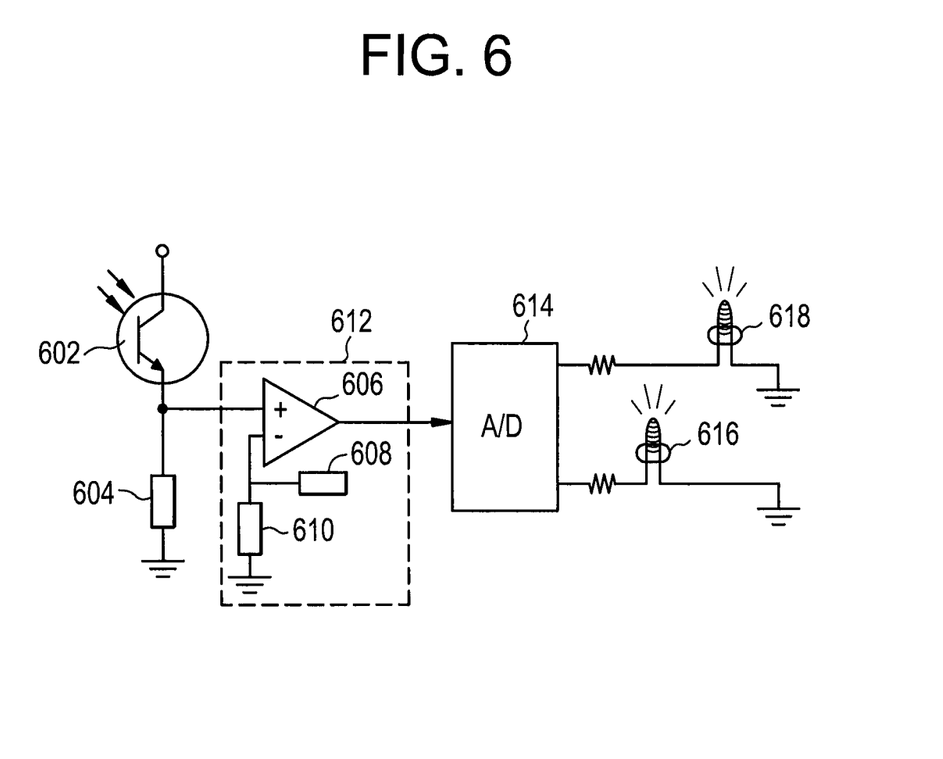
FIG. 6 is a circuit diagram of a photodetector for a suppression system according to an example embodiment of the present disclosure.

FIG. 6 is a circuit diagram of a photodetector for a suppression system according to an example embodiment of the present disclosure. Referring to FIG. 6, a phototransistor 602 is connected to a first load resistor 604 and an amplifier 606. The amplifier 606 together with a second load resistor 608 (e.g., 10 kΩ) and a third load resistor 610 (e.g., 1 kΩ) form a pre-amplifier 612. The pre-amplifier 612 is connected to an analog-to-digital signal controller 614. Furthermore, the analog-to-digital signal controller 614 is connected to a first indicator light 616 and a second indicator light 618. In a non-limiting embodiment, the photodetector 504 in FIG. 5 may be as provided by the circuit diagram of FIG. 6.

During operation of the liquid metal fast reactor, if the tubular container begins to degrade, light will enter and activate the photodetector therein. In particular, referring to FIG. 6, when light is detected by the phototransistor 602, a corresponding voltage signal is sent to the analog-to-digital signal controller 614, which controls the first indicator light 616 and the second indicator light 618. The phototransistor 602 may be configured to detect light with an illuminance ranging between 1-1000 lux. If the tubular container is not degraded and still intact, the first indicator light 616 (e.g., green light) will illuminate to indicate normal conditions. On the other hand, if the tubular container has begun to degrade and break, the second indicator light 618 (e.g., red light) will illuminate to indicate degradation.

Figure 7:
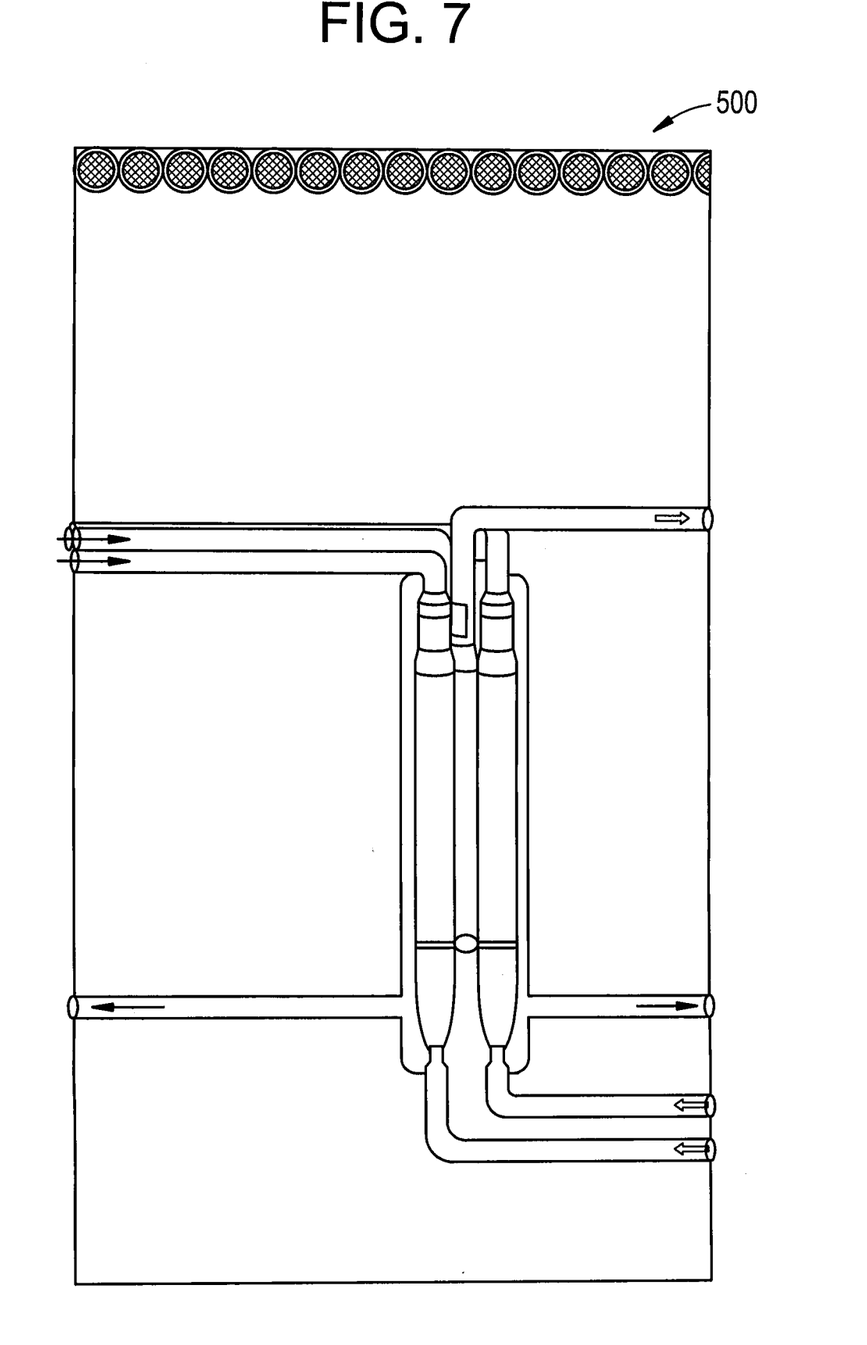
FIG. 7 is a view of a tube-type suppression system as implemented in a nuclear reactor according to an example embodiment of the present disclosure.

FIG. 7 is a view of a tube-type suppression system as implemented in a nuclear reactor according to an example embodiment of the present disclosure. Referring to FIG. 7, the tube-type suppression system 500 is secured to a ceiling above the containment structure. The tube-type suppression system 500 is configured to be heat-activated and/or chemically-activated by a metallic fire.

Figure 8:
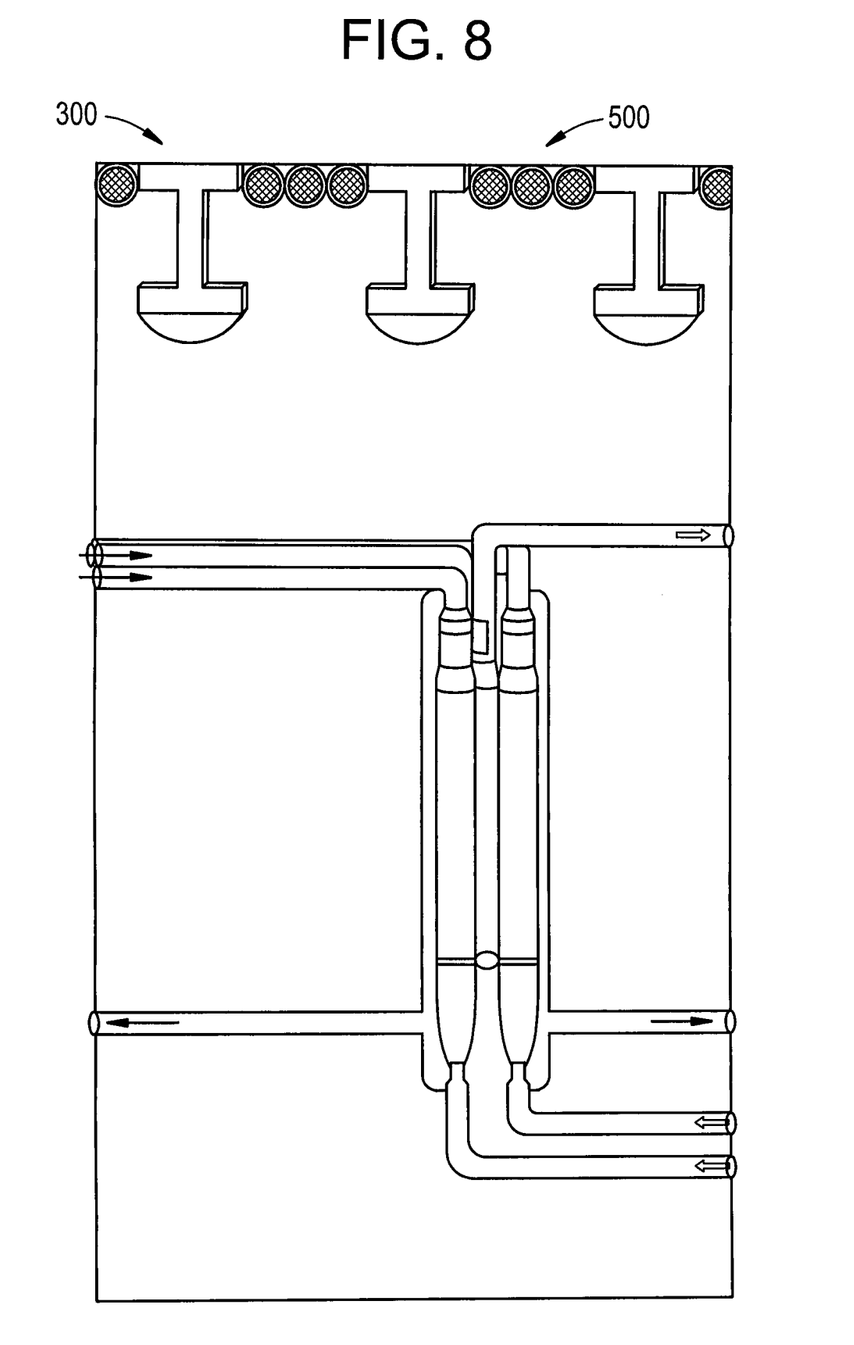
FIG. 8 is a view of an I-beam-type suppression system in conjunction with a tube-type suppression system as implemented in a nuclear reactor according to an example embodiment of the present disclosure.

FIG. 8 is a view of an I-beam-type suppression system in conjunction with a tube-type suppression system as implemented in a nuclear reactor according to an example embodiment of the present disclosure. Referring to FIG. 8, both the I-beam-type suppression system 300 and the tube-type suppression system 500 are secured to a ceiling above the containment structure. Although FIG. 8 shows three tubular containers of the tube-type suppression system 500 being arranged between each I-beam structure of the I-beam-type suppression system 300, it should be understood that example embodiments are not limited thereto. For instance, the number of tubular containers of the tube-type suppression system 500 that can be arranged between each I-beam structure of the I-beam-type suppression system 300 will vary depending on the spacing of the I-beam structures as well as the size of the tubular containers themselves.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method for suppressing a pyrophoric metal fire, comprising:
arranging a suppression system above a containment structure, the suppression system including a first extinguishing agent, the containment structure configured to contain and isolate a pyrophoric metal from ambient air, the suppression system configured to activate upon a leak and ignition of the pyrophoric metal so as to release the first extinguishing agent to suppress the pyrophoric metal fire, the suppression system configured such that a structural integrity thereof degrades in a presence of the pyrophoric metal fire in order to release the first extinguishing agent.

2. The method of claim 1, wherein the structural integrity of the suppression system is configured to deteriorate when a surface of the suppression system reaches an elevated temperature as a result of exposure to the pyrophoric metal fire.

3. The method of claim 2, wherein the structural integrity of the suppression system is configured to break down when the elevated temperature at the surface of the suppression system reaches 75 degrees Celsius or more.

4. The method of claim 1, wherein the structural integrity of the suppression system is configured to deteriorate when exposed to one or more reaction byproducts of the pyrophoric metal fire.

5. The method of claim 4, wherein the structural integrity of the suppression system is configured to become embrittled when the one or more reaction byproducts includes hydrogen gas.

6. The method of claim 5, wherein the structural integrity of the suppression system is configured to break down when a concentration of the hydrogen gas reaches 50 pphm or more.

7. The method of claim 1, wherein the arranging includes positioning the suppression system such that the first extinguishing agent falls on the pyrophoric metal fire via gravity when released.

8. A method for suppressing a pyrophoric metal fire, comprising:
arranging a suppression system above a containment structure, the suppression system including a first extinguishing agent, the containment structure configured to contain and isolate a pyrophoric metal from ambient air, the suppression system configured to activate upon a leak and ignition of the pyrophoric metal so as to release the first extinguishing agent to suppress the pyrophoric metal fire, the suppression system configured as a polymer layer including the first extinguishing agent, the polymer layer being applied on a ceiling above the containment structure.

9. The method of claim 8, wherein the polymer layer includes the following structure wherein X is a chlorine or a carbonate.

10. The method of claim 1, wherein the suppression system is configured as a metal casing that encloses the first extinguishing agent therein.

11. The method of claim 10, wherein the metal casing is configured as a partial-cylindrical container and secured to a bottom of an I-beam structure.

12. The method of claim 10, wherein the metal casing is configured as a tubular container and secured to a ceiling above the containment structure.

13. The method of claim 10, wherein the metal casing is formed to include defects and is infused with hydrogen diffusion promoters.

14. The method of claim 10, wherein the metal casing includes a photodetector installed therein, the photodetector configured to indicate whether there is degradation of the metal casing by detecting whether light is entering the metal casing.

15. The method of claim 10, wherein the first extinguishing agent is a salt-based powder or a graphite-based powder.

16. The method of claim 15, wherein the first extinguishing agent includes a weak acid.

17. The method of claim 1, wherein the pyrophoric metal is an alkali metal.

18. The method of claim 17, wherein the alkali metal is sodium.

19. The method of claim 1, further comprising:
spraying the pyrophoric metal fire with a second extinguishing agent.

* * * * *